United States Patent [19]

Tallon et al.

[11] Patent Number: 4,606,221
[45] Date of Patent: Aug. 19, 1986

[54] METHOD OF DEPOLLUTING A HELIUM LEAK DETECTOR AND APPARATUS IMPLEMENTING THE METHOD

[75] Inventors: Jacques Tallon; Jacques Morel, both of Annecy, France

[73] Assignee: Compagnie Industrielle des Telecommunications Cit-Alcatel, Paris, France

[21] Appl. No.: 713,734

[22] Filed: Mar. 20, 1985

[30] Foreign Application Priority Data

Mar. 23, 1984 [FR] France ................. 84 04565

[51] Int. Cl.$^4$ ........................................... G01M 3/20
[52] U.S. Cl. .................................................. 73/40.7
[58] Field of Search ........................ 73/40.7; 250/288

[56] References Cited

U.S. PATENT DOCUMENTS

| | | | |
|---|---|---|---|
| 3,416,359 | 12/1968 | Durbin et al. | 73/40.7 |
| 3,645,127 | 2/1972 | Mongodin et al. | 73/40.7 |
| 3,762,212 | 10/1973 | Morley et al. | 73/40.7 |
| 3,939,695 | 2/1976 | Booth | 73/40.7 |
| 4,365,158 | 12/1982 | Tallon | 73/40.7 X |
| 4,436,998 | 3/1984 | Tallon | 73/40.7 X |
| 4,510,792 | 4/1985 | Morel et al. | 73/40.7 |

FOREIGN PATENT DOCUMENTS 2713580 10/1978 Fed. Rep. of Germany ....... 73/40.7

OTHER PUBLICATIONS

2418 The Soviet J of Nondestructive Testing, vol. 14, No. 6, (1978.06) Automation of Preparatory Operations in Mass-Spectrometric Leak Testing, pp. 517–520.

Primary Examiner—Stewart J. Levy
Assistant Examiner—Joseph W. Roskos
Attorney, Agent, or Firm—Sughrue, Mion, Zinn, Macpeak & Seas

[57] ABSTRACT

A method of de-polluting a helium leak detector in which a pumping station and a gas analyzer (5) connected to the pumping station via an air inlet duct provided with an insertion valve (6). The pumping station comprises a sliding vane rotary vacuum pump (1) comprising a rotor (7) and a stator (8). The assembly is placed in a sump partially filled with oil (10). A suction duct (11) connects the interior of the stator to the exterior of the sump connects exhaust channel (12) connecting the interior of the stator to the interior of the sump which is in communication with the exterior via a point (14) of the sump which is situated above the oil level. The pumping station further includes a link duct (15) having a fastening (4) for connection to an apparatus to be tested at one end and having its other end connected to the suction duct via a pump isolating valve (2). An air inlet valve (3) is placed in addition on a duct having one end which is open to the exterior and whose other end is connected to the link duct (15) between the connection fastening (4) and the isolating valve (2). With the insertion valve (6) closed, the air contained in the free space in the sump above the oil level is thoroughly swept prior to performing a leak test.

7 Claims, 4 Drawing Figures

METHOD OF DEPOLLUTING A HELIUM LEAK DETECTOR AND APPARATUS IMPLEMENTING THE METHOD

The present invention relates to a method of depolluting a helium leak detector and to apparatus for implementing the method.

BACKGROUND OF THE INVENTION

A helium leak detector essentially comprises two portions as shown in FIG. 1 the accompanying drawing: (1) a pumping station including a sliding vane rotary vacuum pump 1, a pump isolating valve 2 and an air inlet valve 3, and finally an inlet 4 for connection to the chamber to be tested, said inlet 4 being likewise capable of being closed; and (2) a gas analyzer 5 including an inlet valve 6 and connected to the pumping station.

The analyzer 5 detects and measures the quantity of helium which enters the apparatus via the inlet e.

Tests are performed as follows:

The valves 3 and 6 are closed, the valve 2 is opened and the inlet 4 is connected to the chamber to be tested. The pump 1 is switched on to evacuate the chamber. The valve 2 is then closed. The inlet valve 6 is then opened and measurements are performed by directing a jet of helium against the walls of the chamber being tested. If the chamber has a leak, helium enters the chamber and thence passes via the inlet 4 to the analyzer 5 which detects and measures the presence of helium and thus the leak in the chamber under test.

However, it sometimes happens that the analyzer 5 detects a "leak" signal before the chamber under test has had helium applied thereto. This comes from pollution of the installation due, for example, to an earlier test during which helium had entered the circuit. During a subsequent test, the walls and the components of the apparatus degas thereby setting up background noise which appears to be a leak. The presently adopted solution consists in running the vane pump 1 for a certain length of time with the valve 3 closed and the valve 2 open. In come cases this length of time may be very long since the background noise level can be very high. For example, such pumping may continue for two hours. It used to be believed that this pollution is mainly due to degasing of the walls and of the oil contained in the sump of the vane pump, and that this degasing was therefore very slow.

However, the inventor has finally observed after lengthy research into the causes of this pollution, that the main cause stems from a concentration of helium in the free space situated in the sump of the vane pump above the surface of the oil.

If the inlet to a vane pump is designated by e and the space in the sump situated above the oil is designated by S, with said space being substantially at atmospheric pressure, the compression ratio k of a pump of this kind for helium is about $10^7$, i.e. the ratio of helium partial pressure is $Ps/Pe \simeq 10^7$.

If the helium contained in the space S is at the same concentration as the helium which is normally contained in the atmosphere, i.e. as a partial pressure $Ps = 5.10^{-6}$ atmospheres, then:

$$Pe = (5 \times 10^{-6})/10^7 = 10^{-13}$$

and a helium partial pressure of such a value in the inlet ducts of the analyzer is low enough to avoid producing background noise at a level which could cause difficulties. However, if a large amount of helium is injected into the apparatus, the space S contains a much higher proportion of helium, for example at a partial pressure of $10^{-1}$ atmospheres. This gives rise to a partial pressure at the inlet e and thus in the inlet ducts to the analyzer of:

$$Pe = 10^{-1}/10^7 = 10^{-8} \text{ atmospheres.}$$

A helium partial pressure at this level in the inlet limits the performance of the analyzer by creating background noise which is readily detectable by the analyzer 5 even when there is no leak.

The remedy is thus to reduce the helium partial pressure Ps in the sump of the vane pump.

SUMMARY OF THE INVENTION

The present invention thus provides a method of depolluting a helium leak detector comprising a pumping station and a gas analyzer connected to the pumping station via an air inlet duct provided with an insertion valve, the pumping station comprising a sliding vane rotary vacuum pump comprising a rotor and a stator, the assembly being placed in a sump partially filled with oil, a suction duct connecting the interior of the stator to the exterior of the sump, an exhaust channel connecting the interior of the stator to the interior of the sump which is in communication with the exterior via a point of the sump which is situated above the oil level, the pumping station further including a link duct having a fastening for connection to an apparatus to be tested at one end and having its other end connected to the said suction duct via a pump isolating valve, an air inlet valve being placed in addition on a duct having one end which is open to the exterior and whose other end is connected to the said link duct between the connection fastening and the isolating valve, the method including the improvement whereby, with the insertion valve closed, the air contained in the free space in the sump above the oil level is thoroughly swept prior to performing a leak test.

In accordance with a first implementation of the method, the air is swept by operating the pump with its suction connected to atmospheric pressure.

To do this, the pumping station is provided with an electrical control member for causing the pump isolating valve and the air inlet valve to be opened simultaneously.

In accordance with a second practical embodiment implementing the method, an auxiliary valve is mounted on the link duct between the pump isolating valve and the pump itself, said valve having an open position in which it provides direct communication between the atmosphere and the said link duct. The method then proceeds as follows: the pump isolating valve is closed and the auxiliary valve is opened prior to switching on the pump.

In accordance with a second implementation of the method, compressed air is directly injected to the sump of the pump above the oil level. To do this, an additional valve is provided on the sump above the oil level to enable the sump to communicate with the exterior, and to enable it to be connected to compressed air injection means.

BRIEF DESCRIPTION OF THE INVENTION

There follows a description of examples implementing the invention and made with reference to the accompanying drawings, in which.

MORE DETAILED DESCRIPTION

Figure 1:
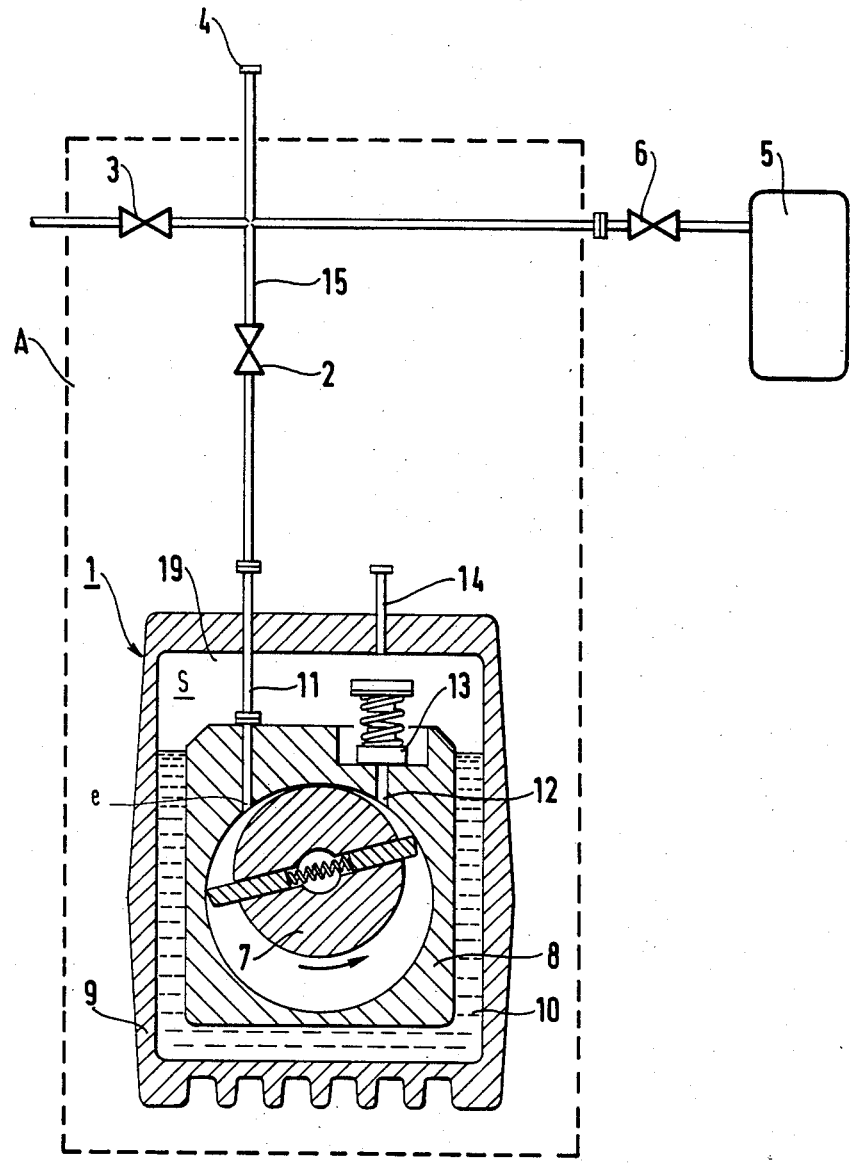
FIG. 1 is a diagram of a prior art leak detector equipment.

FIG. 1 thus shows a leak detection equipment comprising a pumping station outlined by a rectangle A in dashed lines and comprising a sliding vane rotary vacuum pump 1, a pump isolating valve 2, an air inlet valve 3 and a connector 4 for connection to a chamber to be tested. A gas analyzer 5 is connected to the pumping station via an inlet duct provided with an insertion valve 6.

The vane pump 1 comprises a rotor 7 and a stator 8. The stator 8 is placed in a sump 9 which is partially filled with oil 10.

A suction duct 11 connects the interior of the stator to the exterior of the sump, and an exhaust channel 12 connects the interior of the stator to the interior of the sump via a valve 13. The sump 9 communicates via an opening 14 with the exterior. A link duct 15 connects the connector 4 to the suction duct 11. This duct is provided with the isolating valve 2. An air inlet valve 3 is situated between the connector 4 and the isolating valve 2 and it enables the link duct 15 to communicate with the exterior.

Figure 2:
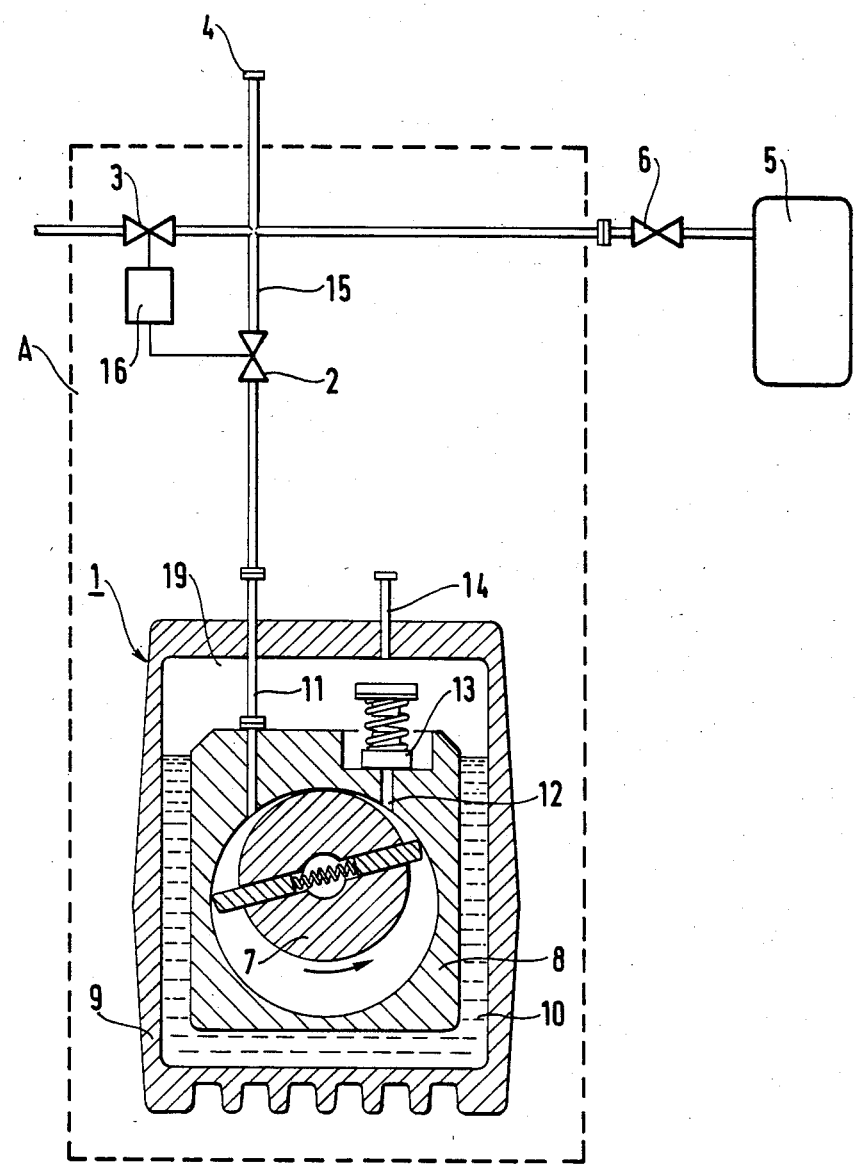
FIGS. 2, 3 and 4 are diagrams of three leak detection equipments in accordance with the invention and suitable for applying the method of the invention.

FIG. 2 shows a first embodiment enabling the method of the invention to be performed. An electrical control member 16 causes the valves 2 and 3 to be opened simultaneously. While the insertion valve 6 is closed, an instruction is given to open these valves 2 and 3 and the pump 1 is turned on so that it operates while sucking in atmospheric air. After one or two minutes, the operation may be stopped and the test may proceed as usual.

Figure 3:
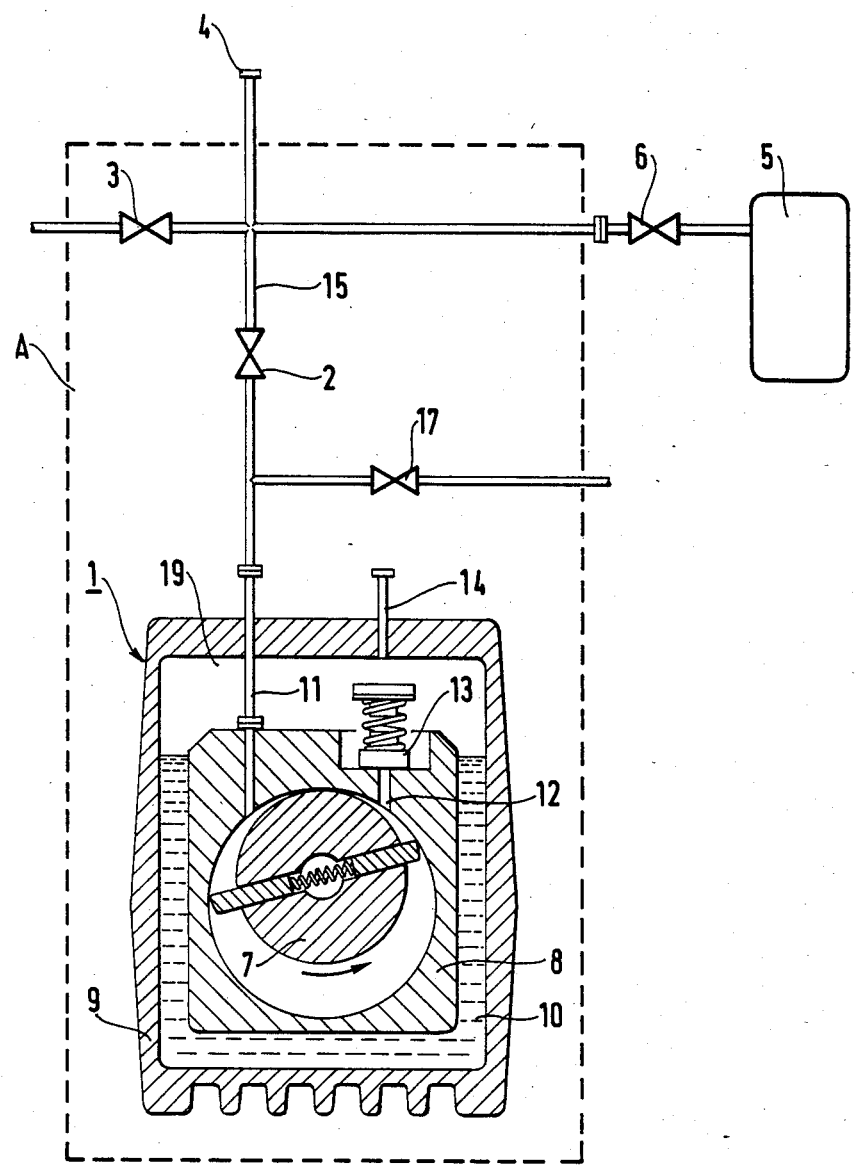

FIG. 3 shows a small variant in which an auxiliary valve 17 has been added to make the link duct 15 communicate with the atmosphere downstream from the pump isolating valve 2. In this variant the free portion of the pump 9 above the level of the oil 10 is likewise de-polluted by causing the pump to operate while sucking atmospheric air by opening the auxiliary valve 17 and closing the isolating valve 2.

Figure 4:
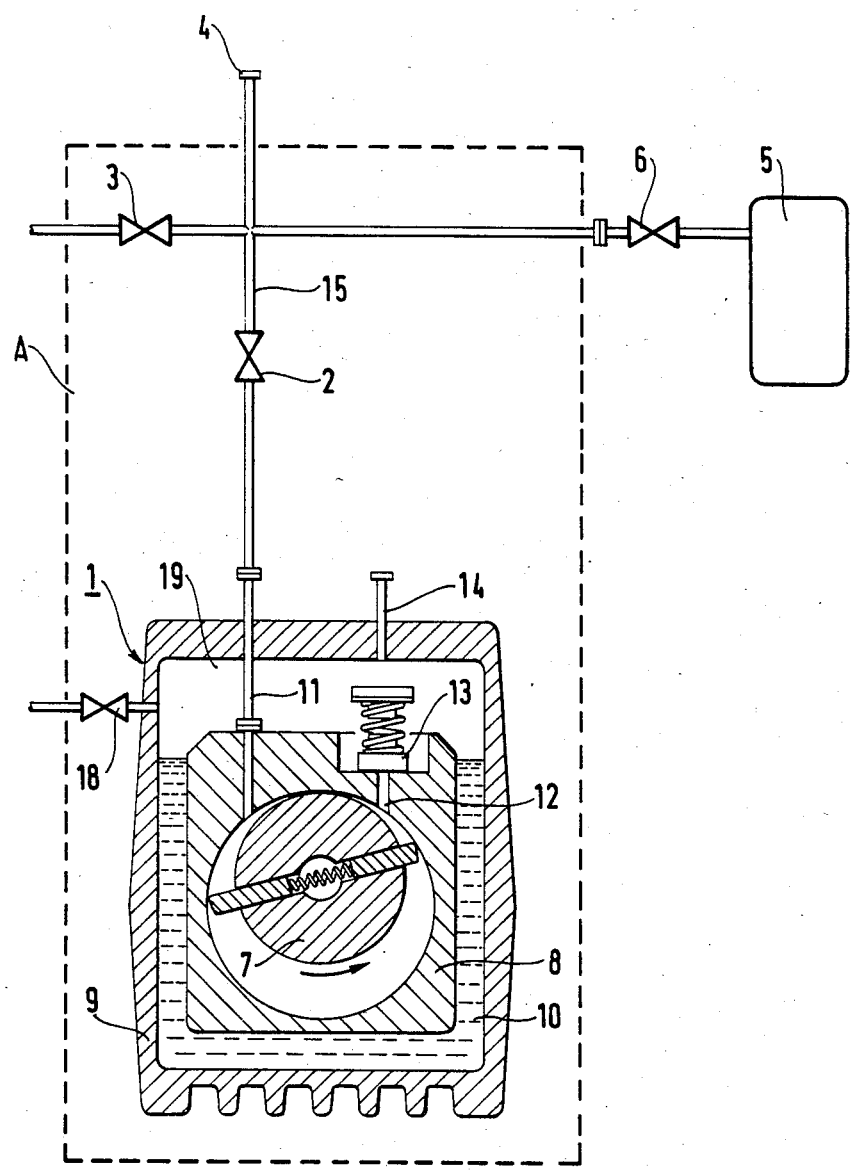

Finally, FIG. 4 shows another variant in which compressed air is directly injected into the sump above the level of the oil. To this end, the sump 9 is provided with an additional valve 18 enabling communication to be established between the free space 19 in the sump and the atmosphere.

It then suffices to open the valve 18 and to send a jet of compressed air into the sump by any suitable means, with the pump in operation or with the pump stopped. The additional valve 18 may be controlled by a simple electrical pushbutton, as may the auxiliary valve 17 shown in FIG. 3.

We claim:

1. A method of de-polluting a helium leak detector comprising a pumping station and a gas analyzer connected to the pumping station via an air inlet duct provided with an insertion valve, the pumping station comprising a sliding vane rotary vacuum pump comprising an assembly of a rotor and a stator, the assembly being placed in a pump sump partially filled with oil, a suction duct connecting the interior of the stator to the exterior of the sump, and exhaust channel connecting the interior of the stator to the interior of the sump which is in communication with the exterior via a point of the sump which is situated above the oil level, the pumping station further including a link duct having a fastening for connection to an apparatus to be tested at one end and having its other end connected to said suction duct via a pump isolating valve, an air inlet valve being placed in addition on a duct having one end which is open to the exterior and the other end being connected to said link duct between the connection fastening and the isolating valve, said helium leak detector being operated under a method including the steps of:

closing said air inlet valve and said insertion valve to the gas analyzer, opening said isolating valve, and connecting said link duct to the apparatus to be tested, switching said pump on to evacuate the apparatus to be tested, closing the isolating valve between the apparatus to be tested and the pump, opening the insertion valve to the gas analyzer, and performing measurements by directing a jet of helium against the walls of the apparatus to be tested such that, if said apparatus has a leak, helium enters the apparatus and then passes via the link duct to the analyzer which detects and measures the presence of helium and thus a leak in the apparatus under test, the improvement comprising closing the insertion valve to the analyzer and causing the air contained in the free space in the sump above the oil level to be thoroughly swept prior to performing a leak test.

2. A method according to claim 1, wherein the air is swept by operating the pump with its suction connected to atmospheric pressure.

3. A method according to claim 2, further comprising the step of closing said pump isolating valve and opening the auxiliary valve prior to switching on the pump.

4. A method according to claim 1, wherein said step of causing air to sweep the free space of the sump comprises directly injecting compressed air into the sump of the pump above the oil level.

5. A helium leak detector comprising:

a pumping station, a gas analyzer, an air inlet duct provided with an insertion valve connecting said gas analyzer to said pumping station, said pumping station comprising a sliding vane rotary vacuum pump, said pump comprising an assembly of a rotor and a stator, said assembly being placed in a pump sump partially filled with oil, a suction duct connecting the interior of the stator to the exterior of the sump, an exhaust channel connecting the interior of the stator to the interior of the sump which is in communication with the exterior via a point of the sump which is situated above the oil level, said pumping station further including a link having a fastening for connection to an apparatus to be tested at one end and having its other end connected to said suction duct via a pump isolating valve, an air inlet valve being placed in addition on a duct having one end which is open to the exterior and whose other end is connected to said link duct between the connection fastening and the isolating valve, and said pumping station being provided with an electrical control member connected to said pump isolating valve and said air inlet valve for opening said pump isolating valve and said air inlet valve simultaneously;

whereby air is swept by operating the pump with its suction connected to atmospheric pressure to depollute the helium leak detector.

6. A helium leak detector comprising:

a pumping station, a gas analyzer, an air inlet duct provided with an insertion valve connecting said gas analyzer to said pumping station, said pumping station comprising a sliding vane rotary vacuum pump, said pump comprising an assembly of a rotor and a stator, said asembly being placed in a pmping station sump partially filled with oil, a suction duct connecting the interior of the stator to the exterior of the sump, an exhaust channel connecting the interior of the stator to the interior of the sump which is in communication with the exterior via a point of the sump which is situated above the oil level, said pumping station further including a link duct having a fastening for connection to an apparatus to be tested at one end and having its other end connected to said suction duct via a pump isolating valve, an air inlet valve being placed in addition on a duct having one end which is open to the exterior and whose other end is connected to said link duct between the connection fastening and the isolating valve, and wherein an auxiliary valve is mounted on said link duct between the pump isolating valve and the pump itself, said auxiliary valve having an open position in which it provides direct communication between the atmosphere and said link duct;

whereby, air swept by operating the pump with its suction connected to atmospheric pressure.

7. A helium leak detector comprising:

a pumping station, a gas analyzer, an air inlet duct provided with an insertion valve connecting said gas analyzer to said pumping station, said pumping station comprising a sliding vane rotary vacuum pump, said pump comprising an assembly of a rotor and a stator, said assembly being placed in a pump sump partially filled with oil, a suction duct connecting the interior of the stator to the exterior of the sump, an exhaust channel connecting the interior of the stator to the interior of the sump which is in communication with the exterior via a point of the sump which is situated above the oil level, said pumping station further including a link duct having a fastening for connection to an apparatus to be tested at one end and having its other end connected to said suction duct via a pump isolating valve, an air inlet valve being placed in addition on a duct having one end which is open to the exterior and whose other end is connected to said link duct between the connection fastening and the isolating valve, and means, with said insertion valve closed, for thoroughly sweeping the free space in the sump above the oil level prior to performing a leak test, said means for sweeping the free space in said sump above the oil level comprising a duct opening from the exterior to the sump above the oil level and an additional valve provided within said exterior opening duct to selectively communicate the sump with the exterior, and to enable it to be connected to compressed air injection means.

* * * * *